United States Patent [19]

Hanaway

[11] Patent Number: 4,466,549

[45] Date of Patent: Aug. 21, 1984

[54] HARVESTER GRAIN BIN WITH FOLDABLE EXTENSIONS

[75] Inventor: Roger D. Hanaway, Blue Springs, Mo.

[73] Assignee: Allis-Chalmers Corporation, Milwaukee, Wis.

[21] Appl. No.: 418,693

[22] Filed: Sep. 16, 1982

[51] Int. Cl.³ .............................................. B65D 7/24
[52] U.S. Cl. ...................................... 220/4 A; 220/6; 220/7
[58] Field of Search .................... 220/4 A, 6, 7, 1.5

[56] References Cited

U.S. PATENT DOCUMENTS

| | | | |
|---|---|---|---|
| 1,198,524 | 9/1916 | Cunliffe | 220/6 |
| 1,822,448 | 9/1931 | Morin | 220/6 X |
| 3,883,005 | 5/1975 | Stevens | 220/4 A X |
| 4,044,910 | 8/1977 | Box | 217/15 X |
| 4,081,099 | 3/1978 | Shead | 220/6 |

Primary Examiner—Steven M. Pollard
Attorney, Agent, or Firm—Charles L. Schwab

[57] ABSTRACT

The capacity of a harvester grain bin (12 or 120) is increased by foldable extensions (37, 38, 39, 41 or 101, 102, 103, 107) pivoted to the upper lips (27, 28, 29, 31 or 113, 114, 128, 129) by hinges (46, 47, 51, 52 or 111, 112, 130, 135) which permit the extensions to be raised from lowered positions to raised positions in which they are secured by corner pins (81, 82, 83, 84 or 104, 106, 108, 109).

7 Claims, 9 Drawing Figures

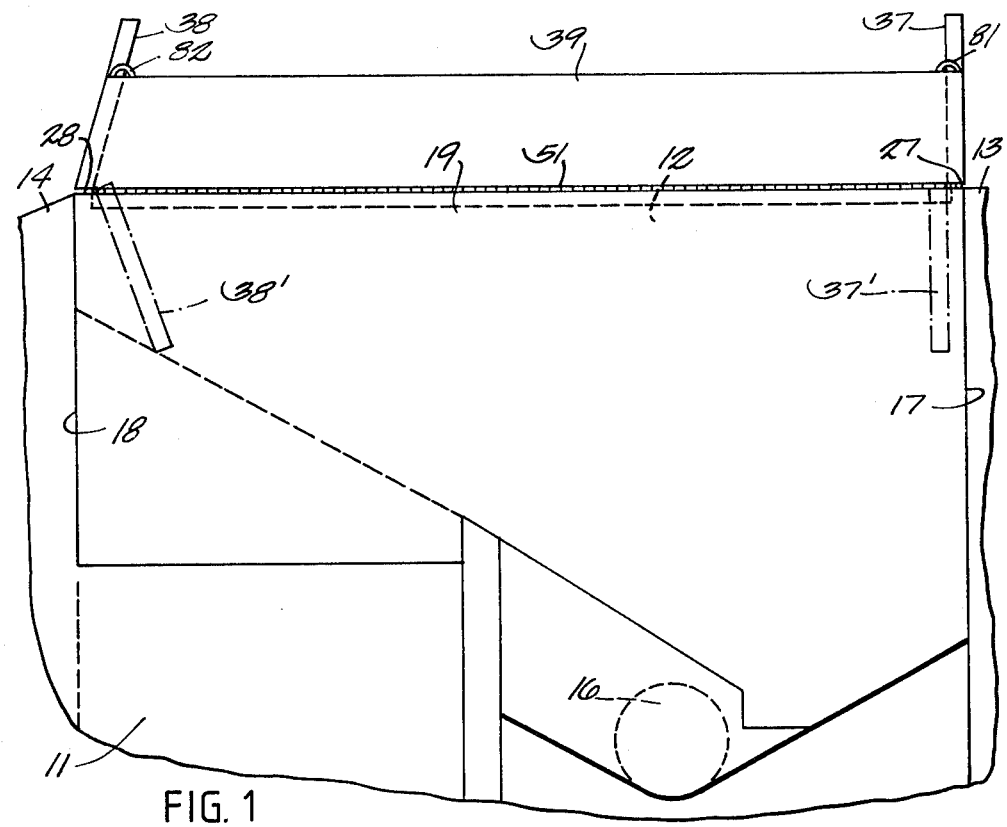
FIG. 1
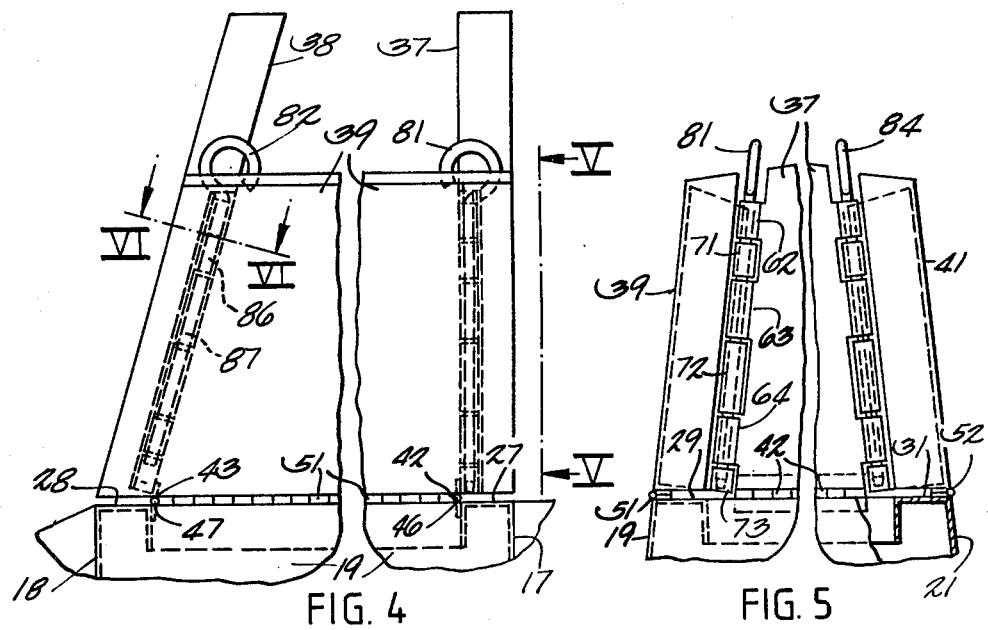
FIG. 4
FIG. 5

4,466,549

HARVESTER GRAIN BIN WITH FOLDABLE EXTENSIONS

BACKGROUND OF THE INVENTION

1. Technical Field

This invention relates to foldable extensions for a harvester grain bin which may be raised to increase the bin capacity.

2. Prior Art

Heretofore, others have provided extensions for grain bins. In some instances, an optional extension is bolted to the top of the grain bin to provide increased grain storage capacity. Another bin extension concept is shown in U.S. Pat. No. 4,106,649 wherein extensions are raised automatically when the grain bin nears a full condition.

BRIEF DESCRIPTION OF THE INVENTION

The grain bin extensions of this invention would normally find use with a harvester grain bin having front and rear walls interconnected by a pair of laterally spaced side walls to define a generally rectangular, or quadrilateral, upward facing opening. The front and rear extensions have their lower edges pivotally connected on transverse horizontal axes to the upper edges or rims of the front and rear walls of the grain bin and a pair of laterally opposite side extensions have their lower ends pivotally connected on longitudinal axes to the upper edges or rims of the laterally opposite side walls of the grain bin. In one version of the invention, the front and rear extensions have predetermined transverse widths permitting them to be folded into the grain bin through the upward facing opening thereof. In another version of the invention, the front and rear extensions fold to horizontal positions. The laterally opposite side extensions are foldable to lowered positions alongside the laterally outward sides of the grain bin side walls. In the raised positions of the extensions, releasable fastening means interconnect adjacent ends of the extensions at the four corners formed by the extensions to hold them in their extended upright positions. When the extensions are folded, the extensions do not substantially increase the height of the grain bin, thus facilitating storage and shipment of the combine. In order to facilitate folding of the extensions, the front and rear extensions are pivoted at their lower inner edges to the inner edges of the rims of the front and rear walls of the bin and the laterally opposite side extensions are pivotally connected at their lower outer edges to the outer edges of the rims of the side walls of the grain bin. The adjacent ends of the extensions may have overlapping parts with aligned openings when the extensions are in their raised, upright positions and a pin may be inserted through the aligned openings to maintain the extensions in their grain bin extending positions.

In the lower position of the side extensions a corner pin may be inserted in vertically aligned openings in a corner of a side extension and a bracket on the grain bin to prevent swinging movement of the extension during transport of the combine. Also, position maintaining struts may be used for maintaining the front and rear extensions in their desired raised and lowered positions.

BRIEF DESCRIPTION OF THE DRAWINGS

Two embodiments of the invention are shown in the drawings, in which:

FIG. 1 is a partial side view of a combine showing a grain bin with extensions of one embodiment of the invention;

FIG. 4 is an enlarged view of the construction shown in FIG. 3 with parts broken away for illustration purposes;

FIG. 5 is a view taken along the line V—V in FIG. 4 with parts broken away for illustration purposes;

DETAILED DESCRIPTION OF THE INVENTION

Figure 2:
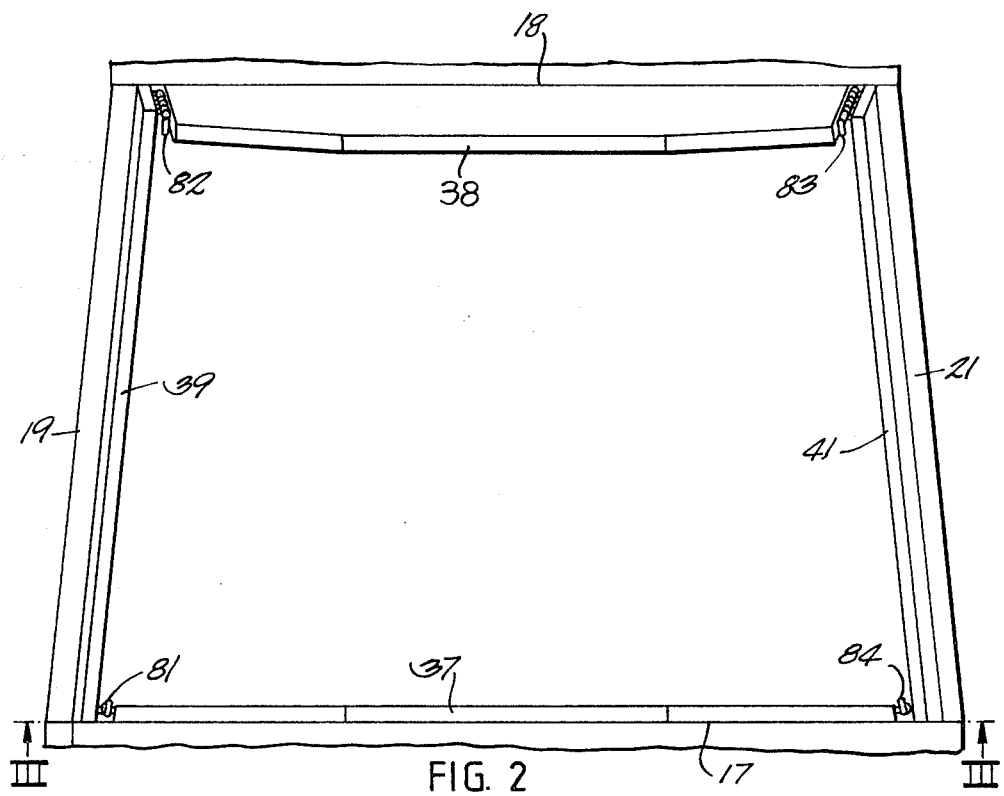
FIG. 2 is a top view of the grain bin and extensions shown in FIG. 1.

Referring to FIGS. 1 through 6, a harvester or combine 11 includes a grain bin 12 disposed between the operator's station 13 and an engine compartment 14. A bin unloading auger conveyor 16 is disposed at the bottom of the grain bin 12. The grain bin includes a front wall 17, a rear wall 18 and a pair of laterally spaced side walls 19 and 21 having upper edges or rims 28, 29, 27 and 31. The height of the grain bin is usually the clearance height of the combine. The owner of the combine may at times wish to extend the capacity of the grain bin, and for that purpose, this invention provides an extension assembly including front and rear extension panels 37, 38 and a pair of side extension panels 39 and 41. The front and rear extensions or panels 37, 38 are pivotally connected at their lower laterally inner or inboard ends by hinges 42, 43 to the upper inboard edges of the lips or rims 27, 28 for pivotal movement about horizontal transverse axes 46, 47 between upright positions illustrated in FIGS. 1, 2, 3, 4, and 5 in the solid lines and folded or lowered positions shown by broken lines 37', 38' in FIG. 1. The side extensions or panels 39, 41 are pivotally connected at their lower laterally outer or outboard edges by hinges 51, 52 to the upper laterally outer or outboard edge of the side wall lips or rims 29, 31 for folding movement from the upright extended position illustrated in solid lines in FIGS. 1 through 5 to a lowered position shown in broken lines 39', 41' in FIG. 3 wherein the extensions are disposed at the laterally outer sides of the bin side walls 19 and 21. The extensions or extension panels 37, 38, 39, 41 form an upward extending continuation of the four sided grain bin 12 to increase its storage capacity, when the extension panels are in their generally upright position as illustrated in FIGS. 1 through 5.

Figure 6:
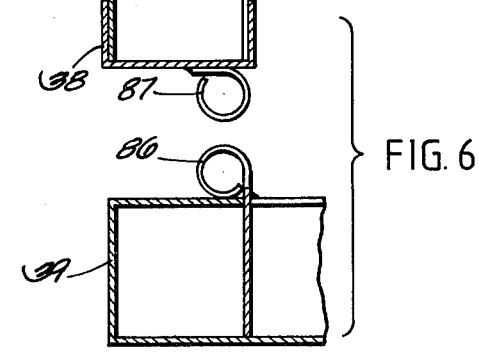
FIG. 6 is a view taken along the line VI—VI in FIG. 4 with parts separated for illustration purposes.

In order to maintain the extension panels 37, 38, 39, 41 in their raised, upright position, a latching arrangement is provided at each corner of the extension assembly which includes hinge-like brackets welded or riveted to the adjacent ends of the extension panels. Looking specifically at FIG. 5, for instance, a laterally outer end of the front extension panel 37 includes latching parts in the form of cylindrical loops 62, 63 and 64 which are in overlapping or interleaved relation with similar loops 71, 72, 73 on the adjacent end of the side panel 39. These parts 62, 63, 64 and 71, 72, 73 present aligned openings in the raised position of the extension panels 37 and 39 to permit insertion of a corner locking pin 81. Pins 82, 83, 84 lock the other corners, formed by the extension panels 37, 38, 39, 41, in a similar manner. In FIG. 6, the panels 38, 39 are separated to show the cooperating cylindrical loops 86, 87 secured, as by welding, to the adjacent ends of the panels 38, 39.

Figure 3:
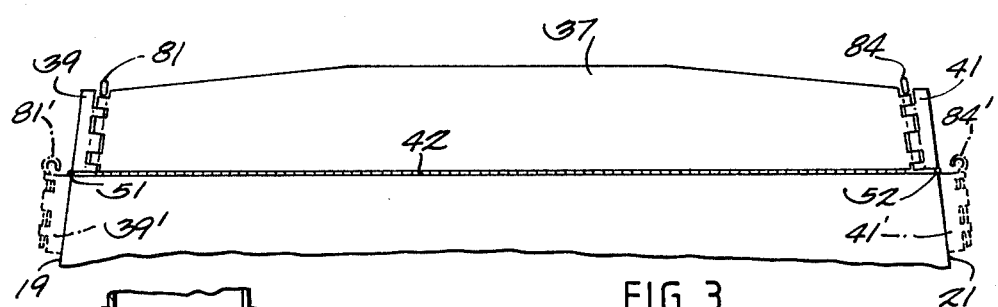
FIG. 3 is a view taken along the line III—III in FIG. 2.

When the extension panels 37, 38, 39, 41 are lowered, the releasable fastening means or pins 81–84 may be stored in the ends of the inverted panels. The stored positions of pins 81, 84 are shown in FIG. 3 by broken lines 81′, 84′, wherein the pins extend downwardly through the openings in the cylindrical loops on the front ends of extensions 39, 41. The pins 81–84 each have an enlarged end which is shaped with an opening large enough to permit the operator to insert a finger by which he can pull the pin out of its corner fastening and stored positions.

Figure 7:
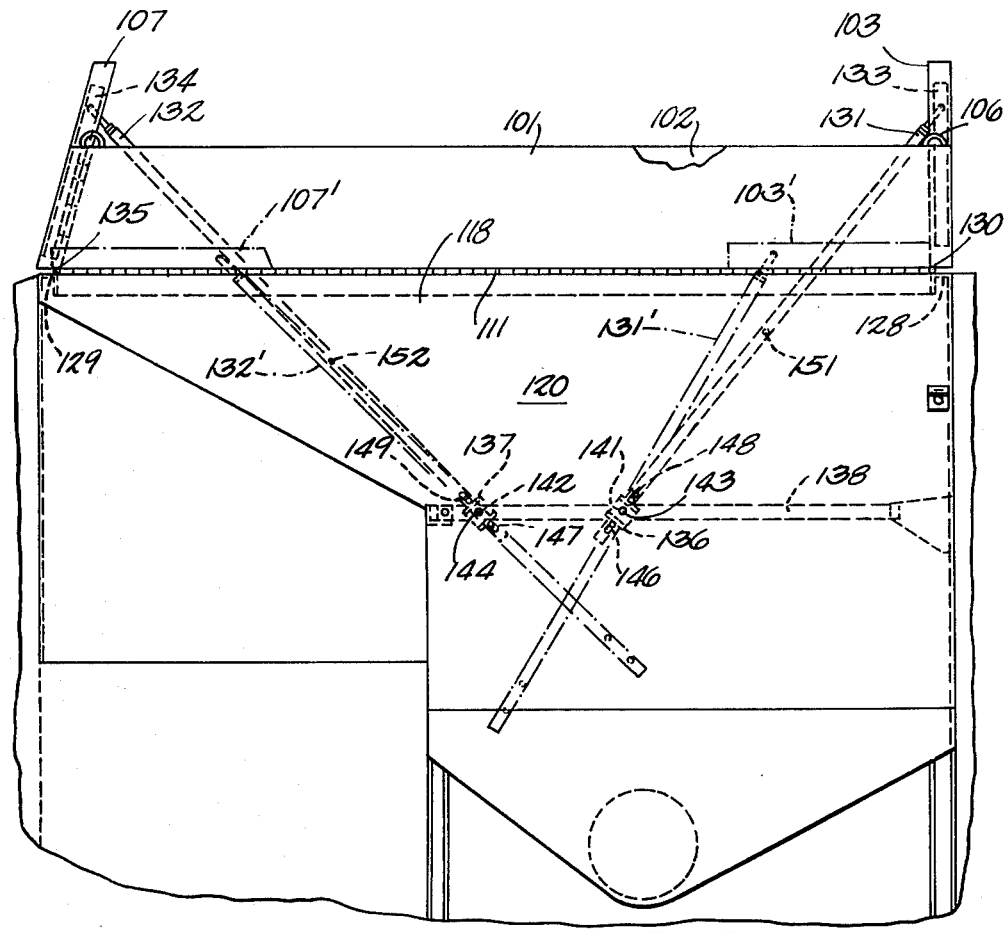
FIG. 7 is a side view of a grain bin and extensions incorporating a second embodiment of the invention.
Figure 9:
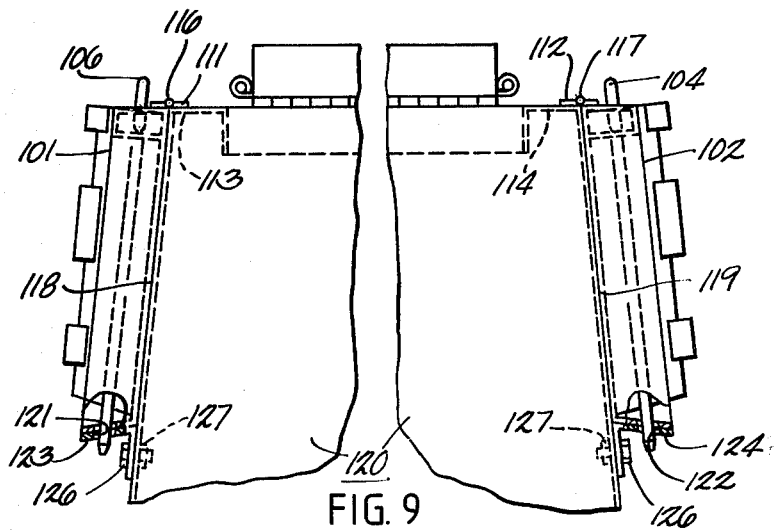
FIG. 9 is an enlarged partial end view of the second embodiment showing the extensions in their lowered positions.
Figure 8:
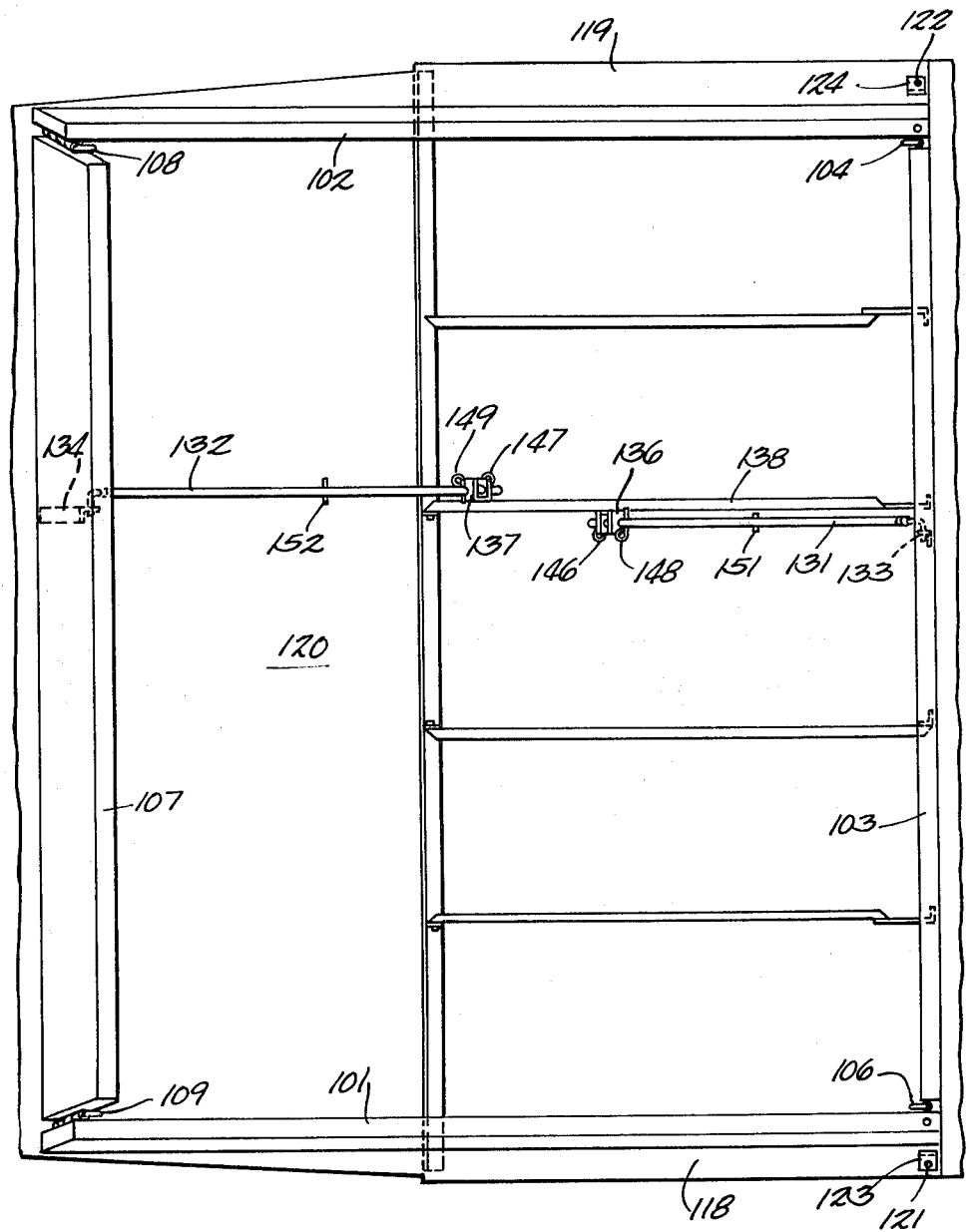
FIG. 8 is a top view of the grain bin and extensions shown in FIG. 7.

Referring to FIGS. 7, 8 and 9 illustrating a second embodiment of the invention, a pair of side extensions or panels 101, 102 are pinned at their front ends to laterally opposite ends of a front extension or panel 103 by removable pins 104, 106 inserted into aligned openings in interleaved loops on adjacent ends of the panels 101, 102, 103. The rear ends of the extension panels 101, 102 are similarly secured to the laterally opposite ends of a rear extension or panel 107 by a pair of pins 108, 109 inserted in aligned openings in interleaved loops on adjacent ends of the panels 101, 102, 107. The lower laterally outer edges of side extension panels 101, 102 are pivoted or hinged by hinges 111, 112 to the upper laterally outer edge of the lips or rims 113, 114 of the side walls 118, 119 of the bin 120 for raising and lowering movement about longitudinal horizontal axes 116, 117 between the extended upright positions shown in FIGS. 7 and 8 to lowered downwardly extending transport positions alongside the bin side walls 118, 119 as shown in FIG. 9. Pins 104 and 106 may be inserted through vertical openings in the front corners of the side panel extensions with their lower ends passing through registering openings 121, 122 in a pair of brackets 123, 124 rigidly secured to the bin side walls 118, 119 by bolts 126 and nuts 127. This securing of the side panel extensions in their lowered position prevents unwanted pivoting or flapping of the panels during movement of the combine.

The front and rear panels 103, 107 are pivotally connected at their lower inner edges to the inner edges of lips or rims 128, 129 by hinges 130, 135. As will be noted from viewing FIG. 8, the front and rear extension panels 103, 107 are of greater lateral dimension or width than the longitudinal dimension of the side extension panels 101, 102. In order to reinforce front and rear panels 103, 107, front and rear struts 131, 132 are provided. The upper front end of the strut 131 is pivotally connected to a bracket 133 on front extension panel 103 and the upper rear end of the strut 132 is pivotally connected to a bracket 134 on the rear extension panel 107. The lower inner ends of the struts slidingly pass through aligned openings in laterally extending legs of U-shaped brackets 136, 137 pivotally connected to a longitudinal brace 138 of the bin 120 by pins 141, 142 on transvere pivot axes 143, 144. Upward sliding movement of the struts 131, 132 relative to the associated U-shaped brackets is limited by pins 146, 147 extending through transverse bores or holes in the struts 131, 132. The panels 103, 107 are locked in their raised positions by removable pins 148, 149 extending through the openings in the struts 131, 132. In the raised position of the front and rear panels 103, 107, as shown in FIGS. 7 and 8, the struts 131, 132 withstand some of the horizontal load imposed on the panels by the grain when the bin is full of grain.

In the folded or lowered transport position of the front and rear panels 103, 107, shown by broken lines 103′, 107′, the struts 131, 132 will move to the positions shown by broken lines 131′, 132′, in which position pins 151, 152, which are pressed into openings in struts 131, 132, abut against the upper legs of brackets 136, 137, respectively, to maintain the panels 103, 107 in their substantially horizontal lowered positions. The pins 148, 149 must be removed from the struts 131, 132 in order to lower the panels 103, 107.

OPERATION

When it is desired to lower the extensions or extension panels 37, 38, 39, 41, the pins 81–84 are withdrawn and the panels are folded from their illustrated vertically extended positions to their lowered positions illustrated by broken lines 37′, 38′ in FIG. 1 and by broken lines 39′, 41′ in FIG. 3. The pins 81–84 are then stored in the openings of the loops at the ends of the panels as shown, for instance, by broken lines 81′, 84′ in FIG. 3. The front and rear panels 37, 38 are of a less lateral width than the lateral distance between inboard edges of the rims 29, 31 of the side walls 19, 21 at the front and rear of the bin whereby the front and rear panels may be folded downwardly into the bin 12 through the upward facing quadrilateral opening at the top of the bin. When it isdesired to raise the lowered extension panels 37, 38, 39, 41 to their extended or upright positions, the stored pins 81–84 are removed and the panels are pivoted upwardly to bring the openings in the ends of the panels into aligment. The pins 81–84 are then inserted in the aligned openings at the four corners formed by the ends of the panels.

When it is desired to lower the extension panels 101, 102, 103, 107, the corner pins 104, 106, 108, 109 are removed. This permits the side panels 101 and 102 to be folded to the lowered transport position alongside the laterally outer sides of the bin side walls 118, 119, as shown in FIG. 9. The pins 106, 104 may then be inserted in the corners of the panels 101, 102 and through the openings in the brackets 123, 124 to restrain the panels against movement relative to the bin side walls 118, 119. The pins 148, 149 are next removed from the struts 131, 132 to permit the front and rear panels 103, 107 to be folded to their horizontal transport positions shown by broken lines 103′, 107′. Abutment of stop pins 151, 152 against the U-shaped brackets 136, 137 supports the panels 103, 107 in their horizontal folded positions.

The embodiments of the invention in which an exclusive property or privilege is claimed are defined as follows:

1. A harvester grain bin having
   a front wall,
   a rear wall,
   a pair of laterally opposite side walls interconnecting said front and rear walls, the upper ends of said walls each presenting a rim of predetermined horizontal width, said rims being substantially coplanar and defining an upwardly facing quadrilateral opening,
   front and rear upright extensions pivotally connected at their lower inboard edges on transverse horizontal axes to the inboard edges of said front and rear walls, respectively, said front and rear extensions being pivotable from extended upright positions downwardly and inwardly to at least to a generally horizontal position, laterally opposite side extensions having their lower outboard edges pivotally connected on longitudinal axes to outboard edges of said rims of said laterally opposite side walls, respectively, said side extensions being pivotable from extended upright positions downwardly to positions alongside the laterally outer sides of said side walls, and releasable fastening means interconnecting adjacent ends of said extensions at the four corners formed by the extensions in their extended upright positions.

2. A harvester grain bin having a front wall, a rear wall, a pair of laterally spaced side walls interconnected at their opposite longitudinal ends to laterally opposite ends of said front and rear walls, said walls each presenting a rim of predetermined width at its upper end, said rims being substantially coplanar and defining an upward facing opening in said bin, front and rear bin extension panels pivotally connected at their lower inboard edge to the inboard edge of said rims on said front and rear walls, respectively, said front and rear bin extension panels being of less transverse width than the distances between the rims on said side walls at the front and rear of said bin opening thereby permitting said front and rear bin extension panels to pivot from an upright bin extension position downwardly through said opening to a lowered position within said grain bin, a pair of laterally opposite side extension panels having their lower outboard edges pivotally connected to the outboard edges of said rims on said side walls, respectively, for pivotal movement about generally longitudinal axes between a generally upright bin extension position and a lowered position at the laterally outer sides of and alongside said side walls, and releasable fastening means securing said extension panels in their upright bin extension positions.

3. The grain bin of claim 2 wherein said releasable fastening means comprises overlapping parts on the ends of said extension panels with openings which are aligned in the upright extension position of said extension panels and releasable upright pins extending through said openings.

4. The grain bin of claim 3 wherein, in the lowered position of said extension panel, said pins may be stored in said openings by downward insertion therein.

5. The bin of claim 1 and further comprising brackets on said side walls presenting vertical openings, vertical openings in corresponding longitudinal ends of said side extensions in vertical alignment with said vertical openings in said brackets permitting removable pins to be inserted through said openings to secure said side extensions against pivoting on said longitudinal axes when in their lowered positions.

6. The bin of claims 1 further comprising a first stabilizing strut having outer and inner ends connected, respectively, to said front extension and said bin and a second stabilizing strut having outer and inner ends connected, respectively, to said rear extension and said bin.

7. The bin of claim 6 and further comprising connecting means adjustably securing said inner ends of said struts to said bin in first and second positions corresponding to the raised and lowered positions of said front and rear extensions.

* * * * *